Nov. 4, 1930.  A. S. CAMERON  1,780,291
OPTICAL APPARATUS
Filed Dec. 6, 1928   3 Sheets-Sheet 1
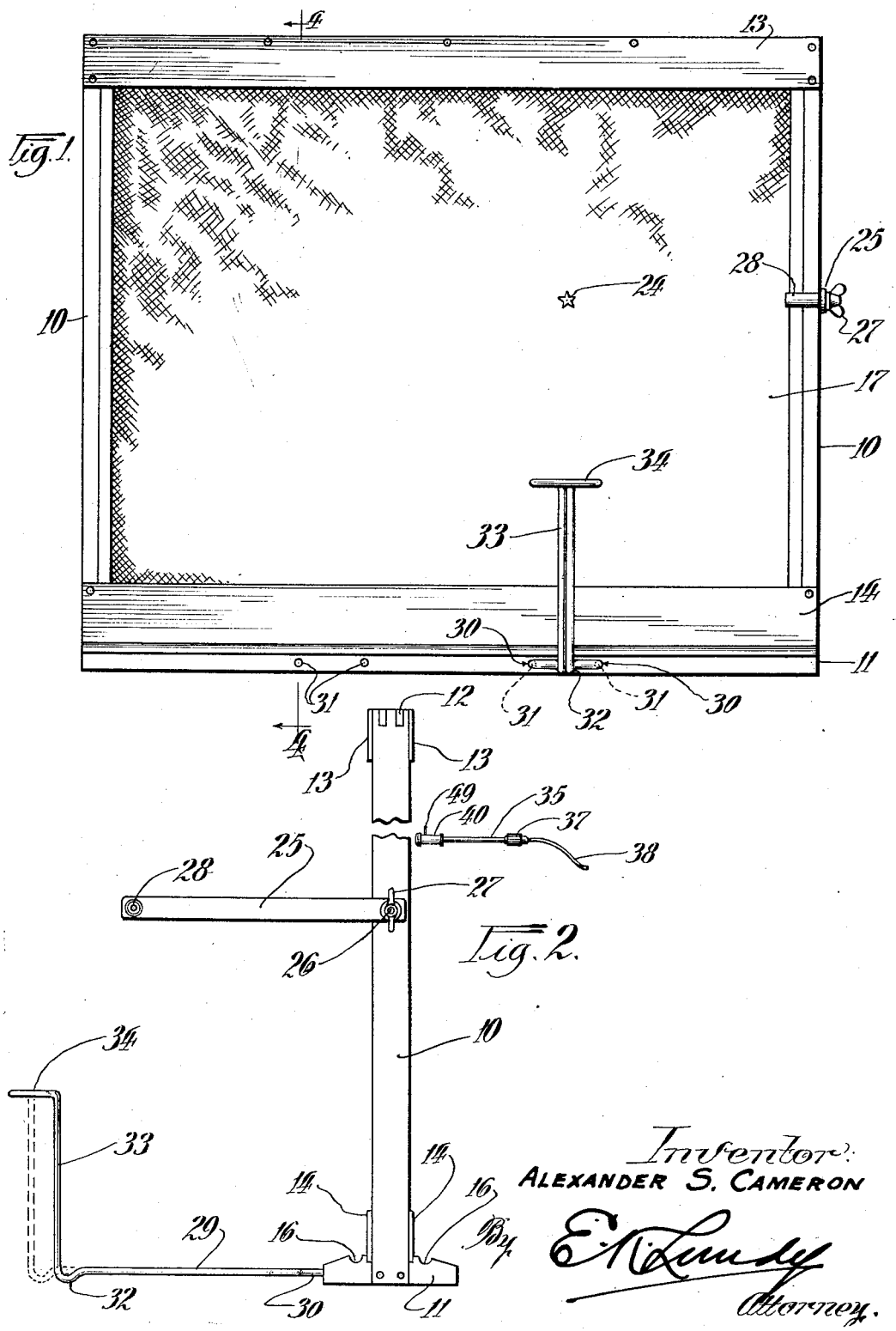

Nov. 4, 1930.  A. S. CAMERON  1,780,291
OPTICAL APPARATUS
Filed Dec. 6, 1928  3 Sheets-Sheet 2
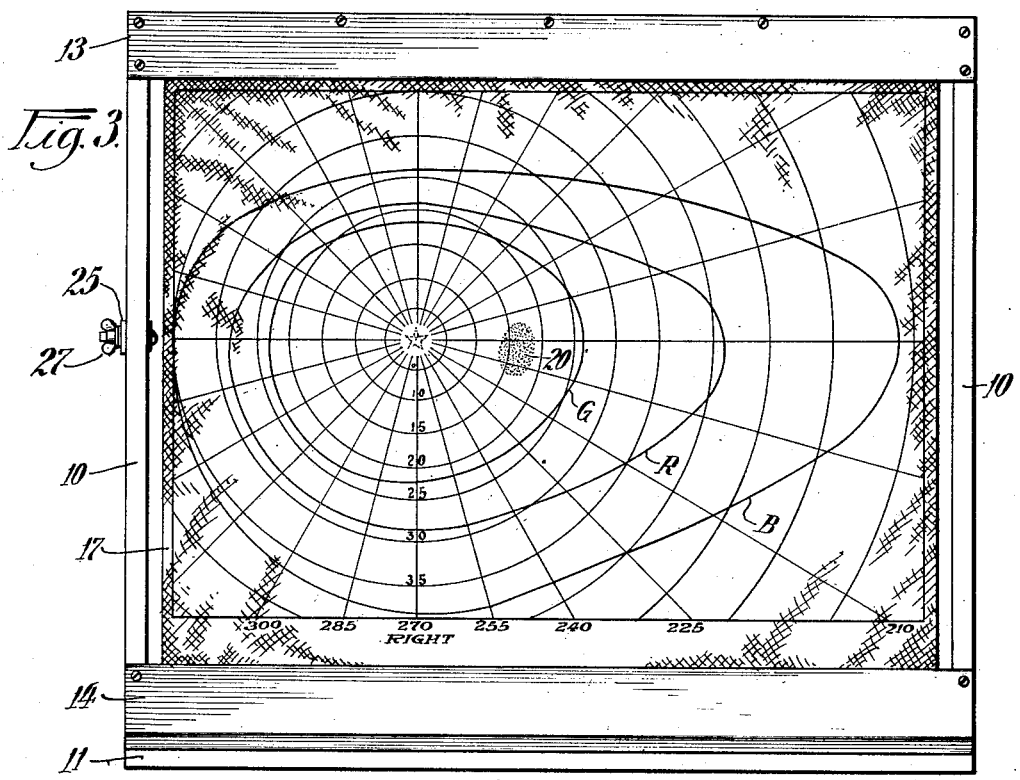
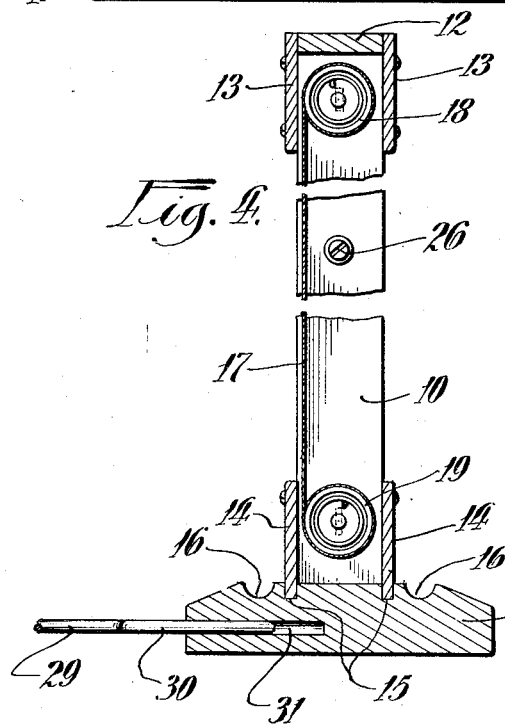
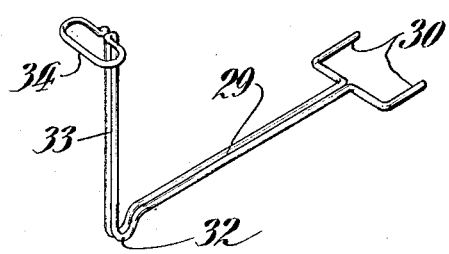
Inventor:
ALEXANDER S. CAMERON
By
Attorney.

Nov. 4, 1930.   A. S. CAMERON   1,780,291
OPTICAL APPARATUS
Filed Dec. 6, 1928   3 Sheets-Sheet 3
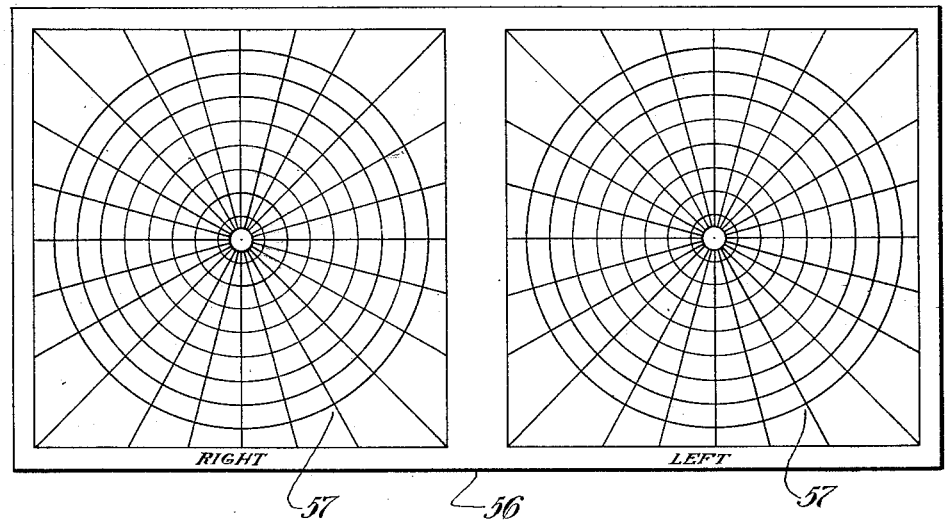
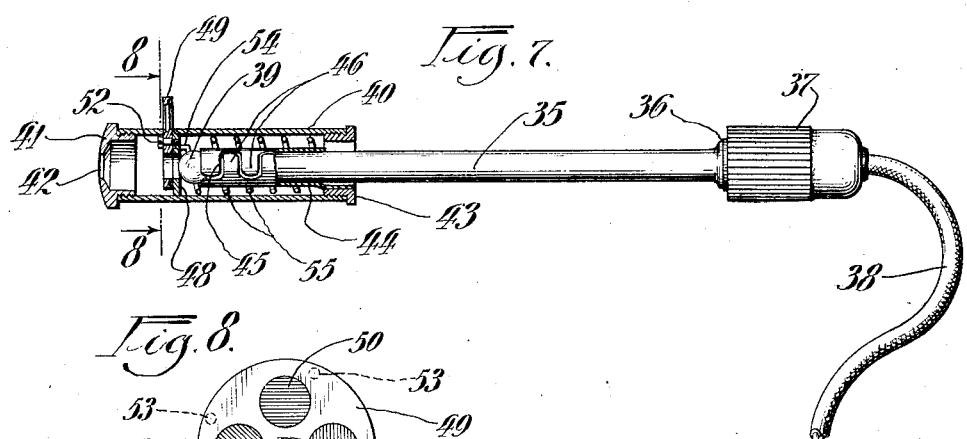
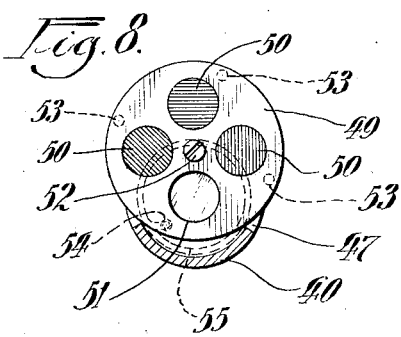
Inventor:
ALEXANDER S. CAMERON Patented Nov. 4, 1930

1,780,291

UNITED STATES PATENT OFFICE

ALEXANDER S. CAMERON, OF CHICAGO, ILLINOIS, ASSIGNOR TO WILLIAM J. CAMERON, OF CHICAGO, ILLINOIS

OPTICAL APPARATUS

Application filed December 6, 1928. Serial No. 324,096.

My invention relates generally to an optical apparatus and it has more particular reference to a device for testing and charting the visual and color fields of a patient's eyes. By means of the apparatus to be hereinafter described the attendant may place before the patient a screen of translucent material upon which there is a fixation point directly in front of the eye to be tested and charted. Nothing else appears upon the screen at which the patient is looking but the attendant projects an image upon the opposite surface of the screen which will be observed by the patient because of the translucency of the screen and by moving the image in proper directions the fields may be measured by the operator.

The surface of the screen facing the operator has a definite diagram and scale upon which is preferably shown a normal visual field and a plurality of color fields and by moving the illuminated image upon the screen and noting the location at which the image disappears while the patient's eye is directed to the fixation point, the areas of the different fields may be determined and the result charted upon a convenient card by the operator. In performing this testing it is desirable to have the pupil of the patient's eye at a definite location with respect to the screen and a fixation point thereon, and for this purpose I provide a sight that has its axis in a plane parallel to the plane of the screen. In conjunction with the sight there is a chin rest which is mounted upon the lower portion of the frame supporting the screen and is movable towards and away from the latter until the patient's eye is observed to be in the proper position when the operator looks through the sight. With the construction I have devised, the patient will see nothing but a plain screen with nothing to detract attention, and the eye may thus be kept constant on the fixation point during the testing operation. The device for projecting the illuminated image upon the screen is manually operated so that the range of the illuminated image is unlimited. Because of the fact that the projecting elements are upon the opposite side of the screen both the operator's hand and the light source are hidden from the patient's view. The screen is made with the right and left hand diagrams arranged one above the other and the screen may be pulled up or down to change the diagram to be used thus avoiding the necessity of a large supporting frame.

I have numerous objects in view among which are provision of an eye testing and charting apparatus that is novel in the construction and arrangement of its parts; is dependable in performing the functions for which it has been designed; is strong and durable so that it will withstand considerable hard usage; and which is economical to manufacture so that it may be produced and sold for a reasonable retail price.

I prefer to accomplish the numerous objects of my invention and to carry out the same in substantially the manner hereinafter fully described and as more particularly pointed out in the claims, reference being now made to the accompanying drawings that form a part of this specification.

In the drawings:—

Fig. 1 is a view in elevation of a portion of my eye testing and charting apparatus looking at the side that is viewed by the patient.

Fig. 2 is a view looking at the right hand end of Fig. 1.

Fig. 3 is a view similar to Fig. 1 looking at the side viewed by the operator.

Fig. 4 is a vertical transverse section taken on line 4—4 Fig. 1.

Fig. 5 is a perspective of the chin rest detached from the frame.

Fig. 6 is a layout or plan of a card upon which the patient's visual and color fields are to be recorded by the operator.

Fig. 7 is a longitudinal view of the image projecting member of the apparatus, the left hand end portion being in longitudinal section.

Fig. 8 is a transverse section taken on line 8—8 of Fig. 7.

The drawings are schematic and disclose a typical or preferred form in which my apparatus may be manufactured; and in said drawings similar reference characters have been employed to designate the same parts wherever they appear throughout the several views.

The apparatus consists of a rectangular frame comprising parallel uprights 10 rising from the ends of an elongated flat base 11, said uprights being connected at their upper ends by a cross-piece 12 that has its ends interfitted with the adjacent upper ends of the uprights in the manner shown in Fig. 2. Front and rear strips or plates 13 are secured to the vertical edges of the cross-piece and uprights so as to provide an elongated box-like housing that is open at its bottom. There are also front and rear bottom strips or plates 14 that connect the lower portions of the uprights 10 and which have their bottom edges fitted into longitudinal grooves 15 formed in the upper surface of the base 11. As will be seen the base is wider and heavier than the cross-piece 12 and it has its longitudinal corners chamfered as shown in Figs. 2 and 4 and its upper surface on each side of the strips 14 is provided with longitudinal pencil depressions 16.

The screen 17 which is employed in connection with the apparatus consists of a vertically disposed sheet of translucent or semi-transparent tissue which may be of any desirable material that is suitable to permit the passage of light rays therethrough and may be made of parchment, tracing cloth or other similar material. The screen 17 is vertically disposed between the uprights and its upper end is wound upon and is secured to a spring actuated curtain-roller 18 having its opposite ends mounted in bearings in the upper facing portions of the uprights 10, and the transverse dimension of the curtain roller is such that it is readily accommodated in the box-like housing at the upper portion of the frame. The opposite or lower end of the screen 17 is wound upon and is secured to a spring actuated curtain-roller 19 the ends of which are mounted in bearings in the facing lower portions of the uprights below the top edges of the strips 14 and said curtain-roller is of such transverse dimensions that it is readily mounted in the box-like housing formed at the lower portions of the uprights and extending along the upper portion of the base 11. These details are shown clearly in Fig. 4.

The screen may be readily rolled upon one curtain-roller and unwound from the other roller. The object of this is to place before the operator a right-eye or left-eye scale and chart such as illustrated in detail in Fig. 3 of the drawing, the scale shown being representative of a patient's normal right-eye. Upon each scale there is a graphic diagram representing different fields of a normal or average patient's eye. In Fig. 3 the fields are identified by the letters "B" "R" and "G" indicating respectfully the colors blue, red, and green. At the intersection of the meridians shown on the scale there is a fixation point in the form of a distinguishing mark to be observed by the patient, and on account of its reflective qualities I form the fixation point by means of a silver star 24 that is placed upon the surface of the screen facing the patient as shown in Fig. 1 or on the side opposite the scale. On the operator's side of the screen or the side bearing the scale there is an oval-shaped figure 20 representing what is commonly known as the "blind-spot" of the eye.

In determining the position of the pupil of the eye the operator may utilize a chin rest and sight. The sight is in the form of a swinging arm 25 having a frictional and pivotal mounting on an adjacent upright through the medium of a pivot bolt 26 upon which the adjacent end of the arm is hung and a winged thumb-nut 27 that is screwed upon the outer end of the bolt and is tightened to clamp the arm in adjusted position. The outer end of the arm is provided with a sight tube 28 the axis of which is parallel with the plane of screen so that when the arm is in the horizontal position shown in Fig. 2 the operator may look through the sight tube 28 and ascertain if the pupil of the eye being tested is in the proper relation to or at the desired distance from the screen. In order to maintain the patient in the desired position an adjustable chin rest is provided, such as shown in the drawings, which consists of a piece of stiff wire bent into the desired shape and reinforced by doubling the major portion of the wire to provide a rigid structure. The chin rest consists of a straight horizontal portion 29 from one end of which there projects the L-shaped fingers or bifurcations 30 that are slidably inserted into spaced holes 31 in the adjacent edge of the base 11. The opposite end of the horizontal portion 29 is formed with an offset open loop 32 that affords a foot to rest upon the table or other support upon which the apparatus is placed. The wire then extends upwardly to provide a vertical standard 33 and at its upper end it is bent into a suitably shaped loop 34 that projects in a horizontal plane at a right angle to the standard.

When the operator looks through the sight tube 38 and ascertains that the pupil of the eye being tested does not aline with the axis of the sight, the chin rest may be moved in either direction in the holes 31 until the eye of the patient is found to be at the proper distance from the screen. On account of the chin rest being formed from heavy wire there is a frictional engagement of the fingers 30 with the walls of the holes 31 so that the chin rest will remain in proper adjusted position. There are two sets of holes 31 in the edge of the base due to the fact that the fixation points 24 are upon each side of the center of the screen and the chin rest should be in vertical alinement with the respective point as shown in Fig. 1.

When the eye of the patient is to be tested, the screen is moved up or down to expose either the right or left eye scale and the diagram to the operator and the proper fixation point to the patient. The chin rest is then placed in holes 31 in the front of the fixation point. It will be seen that by using a screen of this character, and housing it in the above described frame it is unnecessary to employ the large charts or scales heretofore used as they are of considerable area and occupy valuable space in an office of restricted proportions. The operator then positions the patient's chin upon the chin rest and adjusts the latter by observing the pupil through the sight. The patient does not see any of the scale or diagram upon the opposite side of the screen as tests of this character are usually conducted in a darkened room, but the patient will be able, due to the luminosity of the silver star, to fix his gaze thereon. The operator will then project an illuminated image upon the screen and by moving it in the desired directions will be able to readily determine the fields of the patient's visibility.

The projecting element of the apparatus is manually controlled and the image both as to form and color may be changed at the will of the operator.

The image projecting portion of the apparatus comprises a lamp element in the form of an elongated shaft or tube 35 one end of which is provided with an electric plug terminal 36 that is removably inserted into a socket terminal 37 having electric connection with a source of current supplied through a conductor cable 38. The opposite end of the shaft or tube 35 is provided with a lens 39, back of which is housed a miniature bulb. Structures of this character are readily obtainable upon the market in the form of surgical and dental lamps.

In order to concentrate or restrict the light rays I insert the outer end of the lamp member into a light control device, such as shown in section in Fig. 7. This construction consists of an elongated tube 40 into the outer end of which is screwed a cap 41 having a light aperture 42 therein. In order to maintain the lamp member in position the opposite end of the tube 40 is provided with an apertured closure 43 that carries a spring sleeve 44 having an internal diameter slightly less than the external diameter of the light member or shaft 35. The sleeve 44 preferably is split by a serpentine slot 45 that provides alternate interfitting spring tongues 46 that assist in frictionally holding the light elements in position. Intermediate its ends the tube 44 is provided with a transverse slot 47 and alongside the slot there is secured an apertured diaphragm plate 48 the opening in which alines with the light opening 42 in the cap. The diaphragm provides means for mounting a rotatable disk 49 having a plurality of apertures therein containing color screens 50 of the desired tones for color tests and has one plain aperture 51 for the projection of uncolored light. The disk 49 is rotatably mounted upon the diaphragm by means of a small screw or bolt 52 that is shown in the Figs. 7 and 8.

In order to maintain the disk in any of its adjusted positions I provide indentations 53 upon one of its surfaces that are adapted to be engaged by the lateral straight end 54 of a coiled spring 55 that is positioned within the tube 40 in the manner shown and which end 54 passes through the small hole in the diaphragm 48.

In testing the patient's eye to determine the visual field of the particular eye the operator may project a light upon the reverse side of the screen with respect to the patient. While the patient continues to gaze at the fixation point the projected image is moved by the operator along the desired lines to determine the extent of the visual field being tested and is guided and assisted by the lines on the screen chart. After this visual field has been determined the operator may rotate the disk to any of the color screens and by projecting the colored image upon the screen and moving the image in the proper directions the extent and area of the respective color field may be determined and in this test the operator is assisted by the color field lines B, R, and G, on the diagram or scale.

In order to verify certain tests, it is within the power of the operator to instantly change from one color to another at will to determine whether the patient's observation has been correct. During the testing of the patient's eye the operator may note upon the chart or sheet the areas or outline of the respective fields as they are tested and determined, and for this purpose I provide a card 56 such as shown in Fig. 6, bearing upon the face the schematic scales 57 for right and left eyes and corresponding to the respective scales upon the screen.

It will be found that by the use of an apparatus of this character a patient's visual color fields may be readily tested and charted and the same is accomplished with a high degree of accuracy and at all times the image projecting apparatus is under the positive control of the operator who may change the color of the image quickly in order to determine the accuracy of the patient's observation and may move the image to any position desired to consummate the test.

Numerous modifications and changes in the construction herein disclosed may be made without departing from the principles of my invention. I desire it understood that the foregoing detailed description and drawings have been given for clearness of understanding only and no unnecessary limitations should be understood therefrom, but the appended claims should be construed as broadly as permissible in view of the prior art.

What I claim is:—

1. An optical apparatus comprising a translucent screen having a fixation point upon the side towards the patient, and having a diagram upon the opposite side showing definite optical fields which diagram is normally invisible to the patient and means for displaying and moving a test object to any position upon the screen, which object is visible from both sides of the screen.

2. An optical apparatus comprising a translucent screen having a fixation point upon the side towards the patient, and having a diagram upon the opposite side showing definite optical fields which diagram is normally invisible to the patient, and means for projecting an illuminated movable image upon a surface of the screen which is visible upon the opposite side of the latter.

3. An optical apparatus comprising a translucent screen having a fixation point upon the side towards the patient, and having a diagram upon the opposite side showing definite optical fields which diagram is normally invisible to the patient, and means for projecting and changing the color to an image upon a surface of the screen, said image being visible upon the opposite side of the screen and movable to different positions thereon.

4. An optical apparatus comprising a translucent screen having a fixation point upon the side towards the patient, and having a diagram upon the opposite side showing definite optical fields which diagram is normally invisible to the patient, in combination with an image projecting device adapted to display an illuminated movable image upon the screen that is visible from both sides of the latter.

5. An optical apparatus comprising a translucent screen having a fixation point upon the side towards the patient, and having a diagram upon the opposite side showing definite optical fields which diagram is normally invisible to the patient, in combination with a manually operated image projecting device adapted to display an illuminated image upon the screen that is visible from both sides of the latter and adapted to be moved to different positions with respect to said diagram and fixation point.

6. An optical apparatus comprising a translucent screen having a fixation point upon the side towards the patient, and having a diagram upon the opposite side showing definite optical fields which diagram is normally invisible to the patient, in combination with an image projecting device adapted to display an illuminated image upon the screen that is visible from both sides of the latter, and said device provided with means whereby the color of the projected image may be changed at will.

7. An optical apparatus comprising a translucent screen having a fixation point upon the side towards the patient, and having a diagram upon the opposite side showing definite optical fields which diagram is normally invisible to the patient, in combination with a manually operated image projecting device adapted to display an illuminated image upon the screen that is visible from both sides of the latter and adapted to be moved to different positions with respect to said diagram and fixation point, and said device provided with means whereby the color of the projected image may be changed at will.

8. An optical apparatus comprising a translucent screen adapted to be positioned in front of a patient and having a definite optical diagram normally invisible to the patient, a frame with its axis parallel to the plane of the screen, a sight carried by said frame, and a chin support movably mounted with respect to said screen and said sight to correctly position the patient's eye with respect to the screen.

9. An optical apparatus comprising a translucent screen adapted to be positioned in front of a patient and having a definite optical diagram normally invisible to the patient, a frame with its axis parallel to the plane of the screen supporting said screen, a sight carried by said frame, and a chin support movably carried by a portion of the frame and adapted to be moved towards and from the screen in a plane at a right angle to the axis of said sight.

10. An optical apparatus comprising a translucent screen having a fixation point that is visible to the patient, means for projecting a movable light-spot upon said screen, and a scale upon the screen back of the fixation point, and normally invisible to the patient, upon which a patient's ocular fields are measured.

11. An optical apparatus comprising a screen having a fixation point that is visible to the patient, means for projecting an illuminated movable image upon the screen that is visible to the patient, and means on the screen normally invisible to the patient for measuring the ocular fields of the patient as delineated by the path traversed by the image.

12. An apparatus for testing and charting the optical fields of a patient's eyes comprising a translucent screen, a fixation point thereon to be viewed by the patient, a scale at the back of the screen associated with the fixation point and invisible to the patient, and means for providing an illuminated image that is movable with respect to said point and said scale whereby the boundaries of the fields may be determined.

13. An apparatus for testing and charting the optical fields of a patient's eyes comprising a translucent screen, a fixation point thereon to be viewed by the patient, a scale at the back of the screen associated with the fixation point and invisible to the patient, means for providing an illuminated image that is movable with respect to said point, and said scale, and devices for changing the color of the image whereby the boundaries of the visual and color fields may be determined in conjunction with said scale.

14. An apparatus for testing and charting the optical fields of a patient's eyes comprising a translucent screen, a fixation point thereon to be viewed by the patient, a scale at the back of the screen associated with the fixation point and invisible to the patient, and manually operated means movable at will to any position with respect to the screen for providing an illuminated image that traverses a path circumscribing an optical field of the patient's eye under test and with respect to said point and said scale.

15. An apparatus for testing and charting the optical fields of a patient's eyes comprising a translucent screen, a fixation point thereon to be viewed by the patient, a scale at the back of the screen associated with the fixation point and invisible to the patient, manually operated means movable at will to any position with respect to the screen for providing an illuminated image that traverses a path circumscribing an optical field of the patient's eye under test and with respect to said point and said scale, and devices that are manually operated to change the color of the image at will.

Signed at Chicago, in the county of Cook, and State of Illinois, this 28th day of November, 1928.

ALEXANDER S. CAMERON.